March 22, 1966    R. SCHMIDT    3,241,590
SELF-LOCKING SHEET METAL NUT
Filed Aug. 12, 1963    3 Sheets-Sheet 1

Inventor
RUDOLPH SCHMIDT
By Arthur Jacob
Attorney

March 22, 1966 R. SCHMIDT 3,241,590
SELF-LOCKING SHEET METAL NUT
Filed Aug. 12, 1963 3 Sheets-Sheet 2

Inventor
RUDOLPH SCHMIDT
By Arthur Jacob
Attorney

March 22, 1966 R. SCHMIDT 3,241,590
SELF-LOCKING SHEET METAL NUT
Filed Aug. 12, 1963 3 Sheets-Sheet 3

Inventor
RUDOLPH SCHMIDT
By Arthur Jacob
Attorney

United States Patent Office 3,241,590
Patented Mar. 22, 1966

3,241,590
SELF-LOCKING SHEET METAL NUT
Rudolph Schmidt, Mary Allen Lane, Mountainside, N.J.
Filed Aug. 12, 1963, Ser. No. 301,316
2 Claims. (Cl. 151—37)

The present invention relates generally to fastening devices and pertains, more specifically, to self-locking nuts fabricated integrally of sheet material and capable of cooperating with a threaded stud in screw-threaded engagement to perform a fastening function.

Self-locking nuts fabricated of sheet material have been successfully constructed in many forms for a variety of uses and have found wide acceptance in the fastener arts. Because of the demand for large volumes of such fasteners, many variations in structural arrangements have been developed in an effort to increase the operating efficiency of the particular nut itself while minimizing the complexity of the structure so as to maintain relatively low manufacturing costs.

A common type of lock nut now in wide use is made integrally from sheet metal and has an axially extending tubular wall with wrench-engaging faces therein, a web portion extending inwardly at the top of the wall with an aperture in the web formed to engage the threads of a threaded stud and a flange extending outwardly from the bottom of the wall to provide a locking washer. The tubular wall generally has a hexagonal configuration and the washer is usually circular at the outer peripheral margin making the structure easy to fabricate economically in large numbers.

In many installations the above described nut is employed not only for the self-locking feature imparted by the integral flange, but for making electrical contact between the nut and the workpiece which is abutted by the nut by virtue of the intimate contact established between the flange and the surface of the workpiece.

I have devised a structure for a self-locking nut particularly suited to the above outlined installations, which structure requires a minimal departure from current manufacturing techniques and tooling, yet attains unique and highly desirable results in increasing both the locking efficiency of the nut and the ability of the nut to establish an effective electrical contact under a wider variety of workpiece surface conditions.

It is therefore an important object of the invention to provide a self-locking nut fabricated integrally of sheet material and having a structural arrangement imparting a marked increase in locking efficiency over conventional devices and capable of being fabricated without a wide departure from current manufacturing techniques and tooling.

Another object of the invention is to provide a self-locking nut of sheet material capable of increased locking efficiency over conventional devices and having the ability to establish electrical contact with the surface of an abutting workpiece more effectively over a wider variation in surface conditions than conventional devices.

A further object of the invention is to provide a self-locking nut of sheet material having a structural arrangement which employs a conventional nut structure in combination with a unique departure from such a conventional structure in order to attain significantly increased performance without significantly increasing manufacturing costs.

A still further object of the invention is to provide a self-locking nut of sheet material having a structural arrangement which utilizes a conventional nut configuration as an active reinforcing structural component in a unique locking mechanism to provide increased locking efficiency thereby enabling the employment of thinner sheet material with a concomitant decrease in manufacturing costs over conventional devices.

The invention may be described briefly as a one-piece nut of sheet material capable of cooperating with a threaded stud to fasten workpieces together. The nut has an axially extending tubular wall with a polygonal peripheral configuration having an uppermost end and a lowermost end. A web portion is integral with the tubular wall and extends generally radially inwardly at the uppermost end and has an aperture therein capable of receiving the threaded stud in screw-threaded engagement therewith. A continuous flange is integral with the tubular wall and projects generally radially outwardly from the lowermost end, the flange being divided into first and second areas and having a continuous peripheral edge common to the first and second areas. The peripheral edge has first portions bordering the first areas and second portions bordering the second area, the first portions being displaced axially downwardly with respect to the second portions to positions below the lowermost end, the first portions providing workpiece engaging edges when the nut is moved axially downwardly along the threaded stud to contact the workpiece surface.

The invention will be more fully understood and further objects and advantages thereof will become apparent in the following detailed description of preferred embodiments of the invention illustrated in the accompanying drawings in which.

Figure 3:
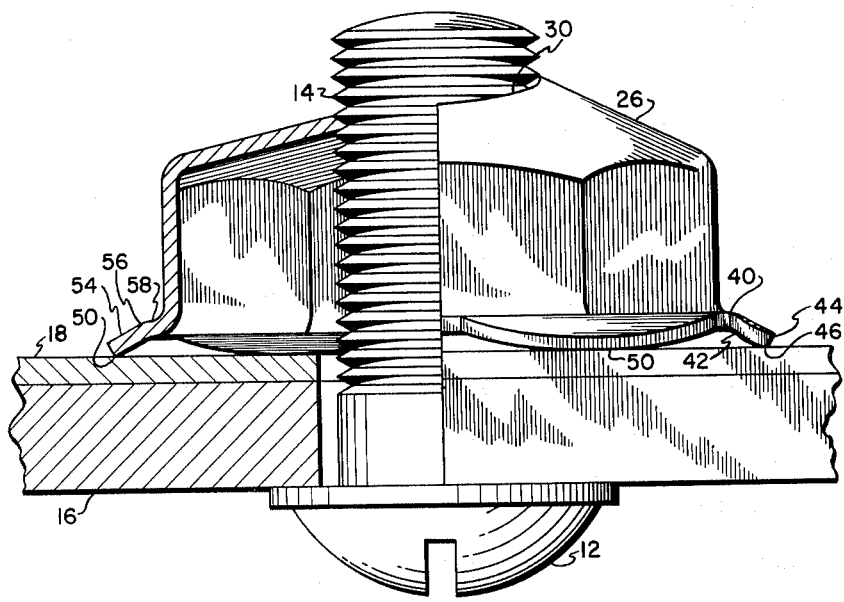
FIGURE 3 is a partially sectioned elevational view of the nut of FIGURE 1 taken along line 3—3, the nut being installed upon a threaded stud and lying upon the surface of a workpiece, but not yet tightened against the workpiece.
Figure 4:
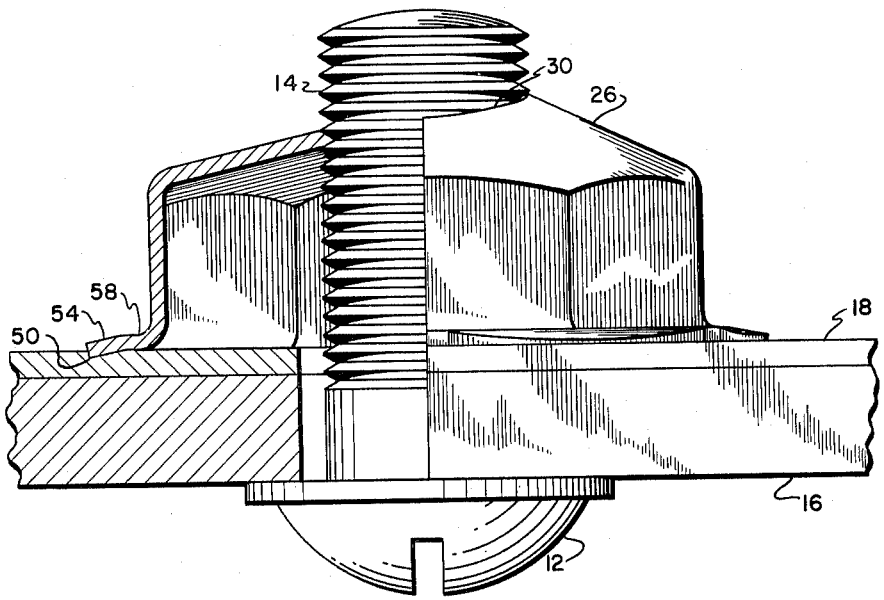
FIGURE 4 is a partially sectioned elevational view similar to FIGURE 3 with the nut shown tightened against the secured workpiece.

Referring to the drawings, and particularly to FIGURES 1 through 4, a nut 10 is shown constructed in accordance with the invention and is fabricated integrally of sheet material having a generally constant thickness, preferably a resilient sheet metal, the sheet material being steel in the illustrated embodiment. As best seen in FIGURES 3 and 4, the one-piece nut 10 is capable of cooperating with a threaded stud shown in the form of machine screw 12 having screw threads 14 to fasten workpieces 16 and 18 together.

Nut 10 is comprised of an axially extending tubular wall 20 having a polygonal peripheral configuration which provides wrench-engaging faces 22, the number of such faces being six in the illustrated embodiment so that the polygonal configuration is a regular hexagon having apexes 24. A web portion 26 of nut 10 is integral with the uppermost end of the tubular wall 20 and extends generally radially inwardly and axially slightly upwardly to form a slightly upwardly domed configuration for purposes which will be explained hereinafter. Within the portion 26 is an aperture 30 which is provided with at least one slot 32 to enable the wall of aperture 30 to be provided with a generally helical configuration capable of receiving threads 14 of stud 12 in screw-threaded engagement. The wall of aperture 30 may be tapered as shown at 34 to facilitate proper engagement with threads 14.

Projecting generally radially outwardly from the lowermost end of the tubular wall 20 is a flange 40 providing basal surface 42 ending in an outer peripheral margin 44. As best seen in FIGURES 3 and 4, the outer margin 44 intersects with the basal surface 42 at a sharp corner to establish a continuous peripheral edge 46. By "continuous" it is meant that the peripheral edge 46 is free of any interruptions such as slots or grooves, the peripheral margin defining a generally annular flange 40 which approaches the configuration of flanges found in conventional nuts constructed from sheet material and having integral washer-like flanges for locking purposes.

In such conventional lock nuts, the basal surface of the flange is relied upon to contact the surface of the workpiece, when the nut is tightened down upon the stud, and establish a frictional locking force between the flange and the workpiece and between the threads of the stud and the nut. In some instances the engagement of the flange with the workpiece surface is relied upon to provide an electrical contact between the nut and the workpiece. Oftentimes the surface of the workpiece is coarse, or is covered with oxide, paint or other coatings which may interfere with the establishment of a good electrical connection, as well as reduce the ability of the flange to establish an effective frictional locking force.

In order to alleviate such difficulties and provide a nut capable of performing both the locking function and the electrical contact function, the invention contemplates a structural departure from the conventional nut, without deviating drastically from the tooling and methods employed in manufacturing such conventional nuts. In nut 10, the structural departure lies in displacing first portions 50 of the peripheral edge 46 axially downwardly with respect to second portions 52 to positions lying below the lowermost end of the tubular wall 20. Thus, edge portions 50 become the first portions to engage the workpiece 18 when the nut 10 is moved axially along the stud 12 as the nut is tightened against the workpiece.

Figure 1:
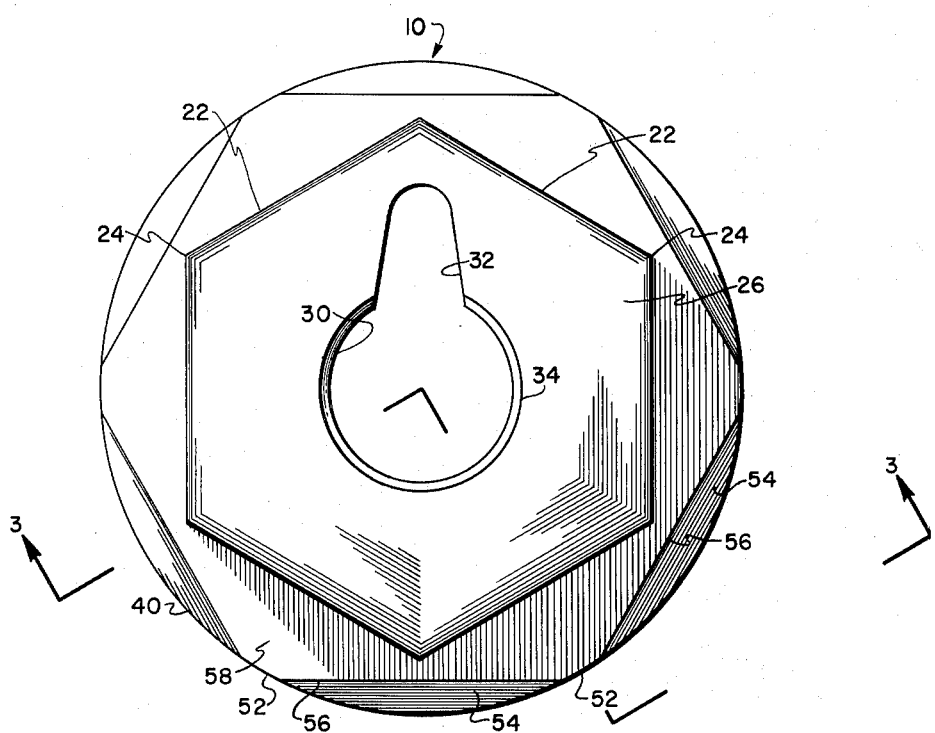
FIGURE 1 is a plan view of a nut constructed in accordance with the invention.
Figure 2:
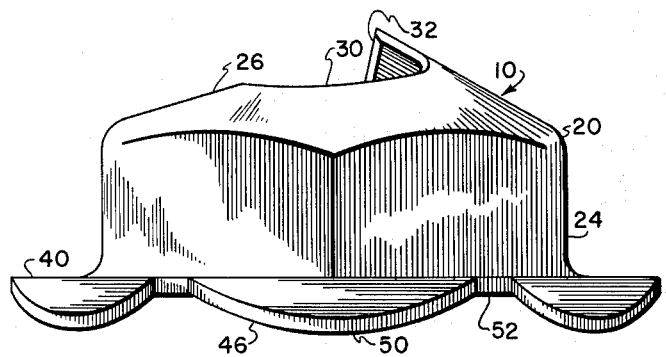
FIGURE 2 is an elevational view of the nut of FIGURE 1.

As best seen in FIGURE 1, the flange 40 is divided into first areas 54 bounded by first edge portions 50 and lines 56 which connect adjacent second edge portions 52, and a second area 58 bounded by lines 56 and the intersection of tubular wall 20 with flange 40. Each first area 54 forms an obtuse angle with the second area 58, the vertices of the obtuse angles lying along lines 56, so that the basal surfaces of first areas 54 are inclined radially outwardly and downwardly from the basal surface of second area 58, the inclination being such that the sharp edges of edge portions 50 are presented to the surface of workpiece 18 as the nut 10 is moved downwardly along the stud 12 toward the workpiece 18. Upon tightening of the nut 10 against the workpiece 18, each area 54 will tend to be elastically deflected upwardly and will establish an elastic reactive force against the surface of the workpiece 18. The elastic reactive force will not only increase the frictional force established between the basal surface 42 of flange 40 and the surface of the workpiece 18, but will tend to collapse the domed configuration of the web portion 26 with the consequent movement of the wall of aperture 30 radially inwardly against threads 14 of the stud 12 so that the nut 10 is locked in place upon the stud 12 by virtue of the gripping of the threads by the aperture wall.

By the proper choice of the obtuse angle at lines 56, the sharp corners of edge portions 50 are made to bite into the surface of the workpiece 18 as the nut 10 is advanced along the stud 12, thus piercing any oxide, paint or other coating which may be on the workpiece surface, as well as compensating for any irregularities in the surface, to establish an effective electrical connection between the nut and the workpiece.

In this respect it is noted that the biting action is facilitated by the fact that edge portions 50 are arcuate so that a smooth head-in portion is provided to allow a clean plowing action as each edge portion 50 contacts the surface of the workpiece and bites into the surface.

When the nut is tightened to the furthest extent along the stud, as shown in FIGURE 4, the obtuse angle between each first area 54 and second area 58 is increased toward a straight angle and the basal surface of the second area 58 contacts the surface of the workpiece 18 to provide a further washer area for increasing the frictional locking force between the nut and the workpiece.

The fabrication of nut 10 may be made to deviate only slightly from the method of manufacturing conventional nuts. As in the manufacture of conventional nuts, the flange of the nut 10 may be initially formed with a circular outer margin and then portions of the flange may be bent axially downwardly along lines 56 to establish the first and second areas 54 and 58, respectively. In this way edge portions 50 and 52 all lie on circles of equal radii and each first area 54 becomes a segment of a circle bounded by the arc of edge portions 50 and the chord of line 56.

It will be apparent that lines 56 may be oriented in any direction with respect to the polygonal configuration of tubular wall 20 to attain the objective of providing workpiece surface engaging edge portions capable of biting into the workpiece. Thus, lines 56 may run parallel to the wrench-engaging faces 22 rather than across the apexes 24 of the tubular wall as shown in FIGURE 1. However, it has been found that the polygonal configuration of tubular wall 20 may be employed as a reinforcing structure for the flange 40 to enhance the biting action of edge portions 50 as well as increase the resistance of areas 54 to axially upward movement by stiffening the flange and reducing unwanted axially upward movement of second area 58 of flange 40 thereby increasing the available elastic reactive force. Such a result is accomplished by orienting lines 56 such that each apex 24 of the polygonal configuration of the tubular wall 20 intersects the flange 40 adjacent the midpoint of a line 56 as shown in FIGURE 1. In this way the plurality of bends in the sheet material at the apex 24, the intersection of faces 22 with flange 40 and the line 56 all cooperate to reinforce the flange against axially upward deflection and it becomes possible to utilize a thinner material than is otherwise necessary to achieve equivalent results, with a concomitant saving in manufacturing costs.

The choice of the obtuse angle between the first and second areas 54 and 58, respectively, of the flange 40 is generally dictated by the characteristics of the particular material employed, the thickness of the material, and the general proportions of the nut and flange structure. The angle must be great enough to allow flexing of the flange along lines 56 during tightening of the nut to increase the angle, yet not so great as to allow such flexing to take place without the establishment of a biting action at edge portions 50. If the angle is too great to begin with, edge portions 50 will merely slide radially outwardly along the surface of workpiece 18 as the angle increases without biting into the surface, while if the angle is initially too small, contact between the entire basal surface 42 of the flange 40 and the surface of the workpiece may not be accomplished when the nut is adequately tightened against the workpiece.

Figure 5:
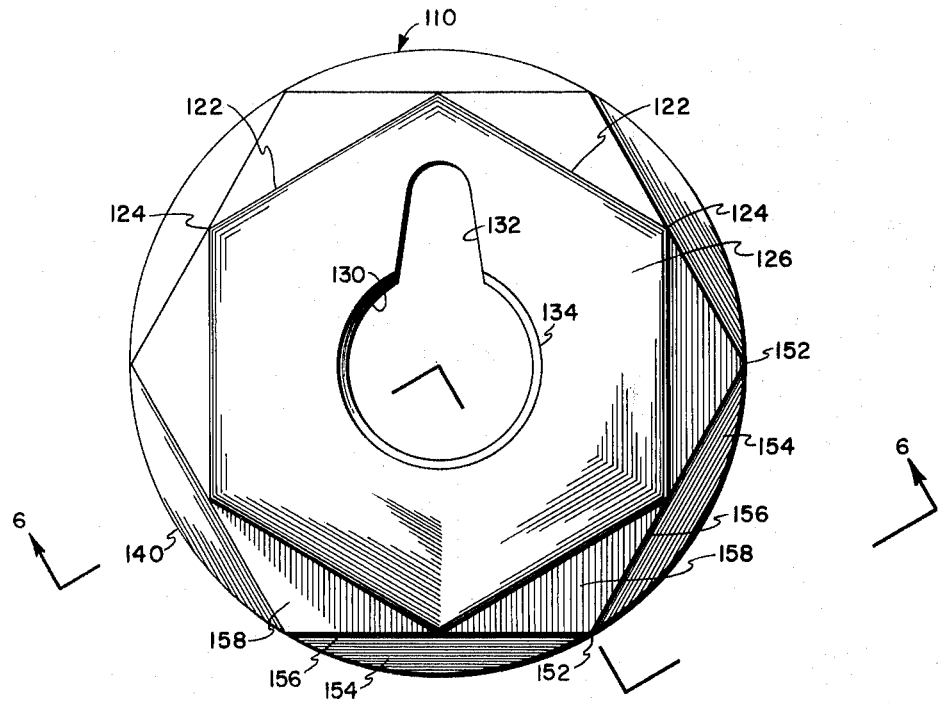
FIGURE 5 is a plan view of another nut constructed in accordance with the invention.
Figure 6:
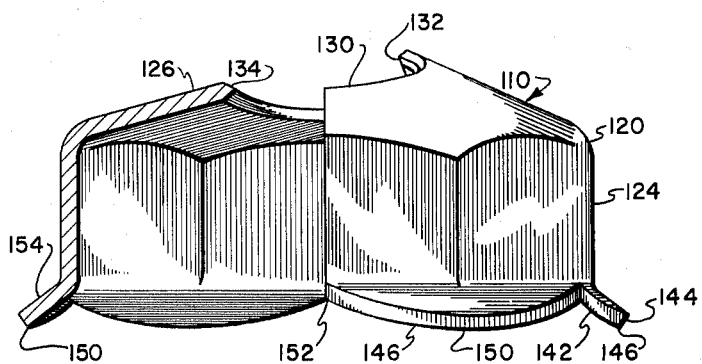
FIGURE 6 is an elevational view of the nut of FIGURE 5 partially sectioned along line 6—6.

The above outlined reinforcing effect of the plurality of bends in the structural arrangement of nut 10 increases with the proximity of lines 56 to apexes 24. Thus, in the embodiment of FIGURES 5 and 6, a nut 110 is shown having a tubular wall 120 with a polygonal peripheral configuration including wrench-engaging faces 122 and apexes 124. As in the embodiment of FIGURES 1 through 4, a web portion 126 at the uppermost end of the wall is provided with a helical walled aperture 130 having a slot 132 and being tapered at 134. A flange 140 projects from the lowermost end of the tubular wall and includes a basal surface 142 and an outer margin 144 defining a continuous peripheral edge 146 with first edge portions 150 displaced axially downwardly with respect to second edge portions 152. However, in the instant embodiment, flange 140 is divided into first areas 154 bounded by first edge portions 150 and lines 156 which not only connect adjacent second edge portions 152, but also intersect apexes 124 adjacent the midpoint of each line 156, and second areas 158 bounded by lines 156 and the intersection of tubular wall 120 with flange 140. First areas 154 are inclined radially outwardly and downwardly with respect to areas 158 so that nut 110 operates in much the same manner as nut 10, but the increased proximity of lines 156 to apexes 124 increases the reinforcement available at lines 156 as a result of the polygonal peripheral configuration of tubular wall 120 thus making available an even greater resistance to upward deflection of the flange 140 when nut 110 is applied to a threaded stud and tightened against a workpiece to perform a fastening function.

It is to be understood that the above detailed description of an embodiment of the invention is provided by way of example only and in not intended to restrict the invention. Modifications may be made in various details of design and construction without departing from the true spirit and scope of the invention as defined in the appended claims.

I claim:

1. A one-piece, self-locking nut of sheet material capable of cooperating with a threaded stud to fasten workpieces together, said nut comprising:
   (A) an axially extending tubular wall having a polygonal peripheral configuration with an uppermost end and a lowermost end;
   (B) a web portion integral with said tubular wall at said uppermost end;
   (C) an aperture in said web portion capable of receiving the threaded stud in screw-threaded engagement therewith;
   (O) a continuous flange integral with said tubular wall and projecting generally radially outwardly from said lowermost end, said flange being divided into first and second areas and having a continuous peripheral edge common to said first and second areas and including a lowermost basal surface and an outer peripheral margin, said basal surface and said peripheral margin intersecting at said peripheral edge in a sharp corner; and
   (E) said peripheral edge having first portions bordering said first areas and second portions bordering said second area, said first portions being displaced axially downwardly with respect to said second portions to positions below said lowermost end, said first portions providing workpiece engaging edges when said nut is moved axially downwardly along the threaded stud to contact the workpiece surface, said first areas being bounded by said first portions of said peripheral edge and lines connecting adjacent second portions of said peripheral edge, and said second area being bounded by said lines and the intersection of said tubular wall with said flange, each apex of said polygonal configuration of said tubular wall intersecting said flange opposite the mid-point of one of said lines and so closely adjacent the midpoint of one of said lines as to reinforce said flange and reduce unwanted axially upward movement of said second area upon said downward movement against the workpiece surface, the basal surface of each said first area forming an obtuse angle with the basal surface of each said second area, the vertexes of which angles lie along said lines so that sharp corners are presented to the surface of a workpiece by virtue of the inclination of said basal surfaces at said angles, said inclination being such that said workpiece engaging edges bite into said workpiece surface upon said downward movement and allow the basal surface of said second area to bear against said workpiece surface when advancement of the nut along the stud into assembled relationship is completed, said first and second portions of said peripheral edge lying on circles of equal radii and said lines being chords subtending arcs of said circles so that each said first area is a segment of one of said circles.

2. A one-piece, self-locking nut of claim 1 wherein each apex of said polygonal peripheral configuration of said tubular wall intersects one of said lines adjacent the midpoint of said line.

References Cited by the Examiner

UNITED STATES PATENTS

| 367,196 | 7/1887 | Deblieux | 151—37 |
| 1,920,792 | 8/1933 | Hotchkin | 151—37 |
| 2,734,547 | 2/1956 | Hotchkin | 151—38 |
| 3,086,421 | 4/1963 | Hamman | 151—37 |
| 3,137,197 | 6/1964 | Meyer. | |
| 3,164,055 | 1/1965 | Duffy | 151—38 |

CARL W. TOMLIN, *Primary Examiner.*

EDWARD C. ALLEN, *Examiner.*